INVENTOR.
TULLIO CAMPAGNOLO

May 11, 1965     T. CAMPAGNOLO     3,182,755
HYDRAULICALLY AND MECHANICALLY OPERATED
DISC BRAKE FOR MOTOR VEHICLES
Filed Dec. 2, 1963     2 Sheets-Sheet 2

INVENTOR.
TULLIO CAMPAGNOLO
BY

United States Patent Office 3,182,755
Patented May 11, 1965

3,182,755
HYDRAULICALLY AND MECHANICALLY OPERATED DISC BRAKE FOR MOTOR VEHICLES
Tullio Campagnolo, Corso Padova 160, Vicenza, Italy
Filed Dec. 2, 1963, Ser. No. 327,366
Claims priority, application Italy, Dec. 7, 1962,
24,117/62
1 Claim. (Cl. 188—73)

The present invention relates to a disc brake the operation of which can be effected both hydraulically, during normal running, and mechanically, when stationary or in cases of emergency.

It is known that, with the aim of making the running of motor vehicles and in particular of motor cars safer and safer, it has already for some time past become an established tendency, and sometimes the rule, to equip the said vehicles with a double braking system by installing, in addition to the normal hydraulic brakes, also mechanically actuated brakes adapted to act both as parking brakes and as effective emergency brakes.

In the field of conventional drum brakes, there are many constructions on these lines, whereas in the field of disc brakes there have heretofore been no simple and effective solutions to the problem.

An object of the present invention is to provide an improved disc braking system for motor vehicles, including the normal hydraulic brakes and also mechanically actuated brakes.

According to the present invention, there is provided a disc braking system of the type comprising at least one disc fast with an axially fixed rotating part of the vehicle, such as a wheel, and with the periphery of which there co-operates at least one pair of friction elements actuatable to engage the opposite faces of the disc, characterised in that two pairs of friction pads spaced angularly along the periphery of the disc are provided, one of which is actuated by hydraulic means for braking during normal running, while the other is actuated by mechanical means for immobilizing the vehicle when stationary and for emergency braking.

A brake of this type is shown in the accompanying drawings purely by way of example and will now be described in detail with reference to the said drawings, in which.

Figure 1:
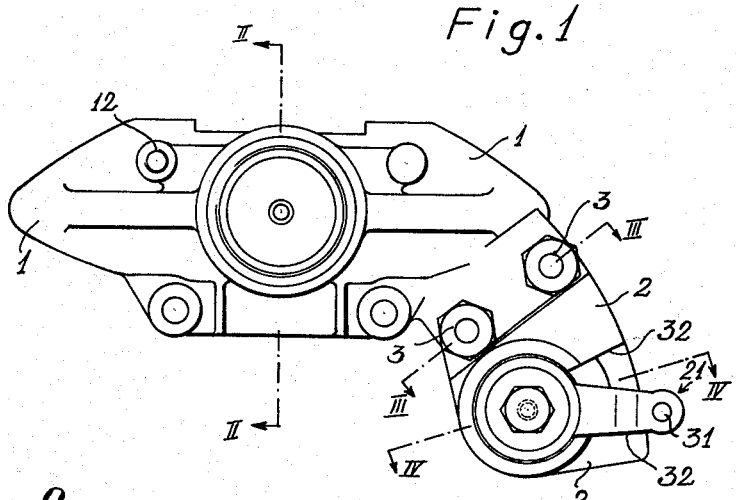
FIG. 1 is a general side view of the disc brake according to the invention.
Figure 2:
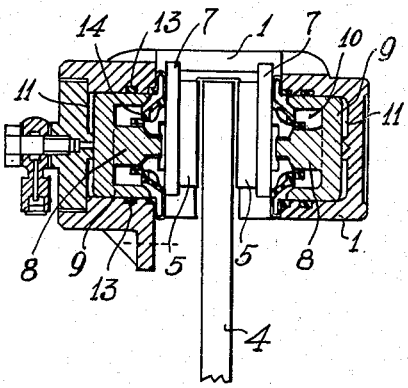
FIGS. 2, 3 and 4 are views, partly in section, taken on the lines II—II, III—III and IV—IV, respectively, in FIG. 1.

According to the form of embodiment shown in FIGS. 1 to 4, the brake according to the invention comprises a bridge-like body or member constituted by two blocks 1 and 2 interconnected by bolts 3 and straddling the braking disc 4 (FIG. 2) fast with the wheel of the vehicle on which the brake is designed to act. The block 1 is equipped with a first pair of hydraulically controlled friction elements or pads 5, while the block 2 carries a second pair of mechanically actuated friction elements or pads 6. The first pair of friction pads 5 are supported from a first pair of opposed seats in block 1, and the second pair of friction pads 6 are supported from a second pair of opposed seats in block 2, the latter seats being angularly spaced with respect to the periphery of braking disc 4, as shown in FIG. 1.

The hydraulically controlled pads 5 (FIG. 2) are carried in known manner by plates 7 mounted to oscillate on the central projection 8 of pistons 9 provided with an annular cavity 10 and sliding in opposed cylinders 11 of the block 1 of the bridge-like body. The displacement of the pistons 9 is produced by a fluid under pressure supplied through the connection 12 (FIG. 1) between the ends of the said pistons and those of the cylinders 11.

Fluid-tightness between the walls of the cylinders 11 and those of the pistons 9 is ensured by rings 13 of rubber or other similar elastic material which are inserted in suitable grooves in the walls of the cylinders 11 and are also adapted to ensure the necessary return action of the pistons 9 to their inoperative position.

The reference numeral 14 indicates dust covers which enable the sliding surfaces between the cylinders and pistons to be kept clean.

Figure 5:
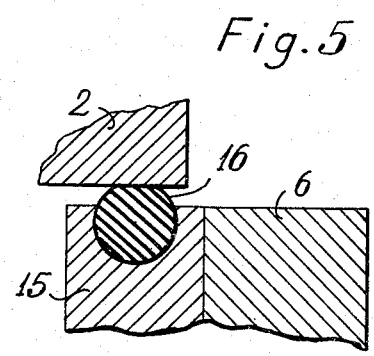
FIG. 5 illustrates in section and on an enlarged scale details of assembly of the mechanically actuated pads of the brake corresponding to the portion of the FIG. 4 indicated by the arrow F.
Figure 4:
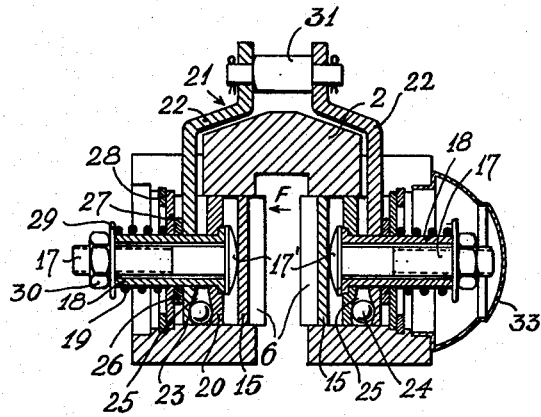
Figure 3:
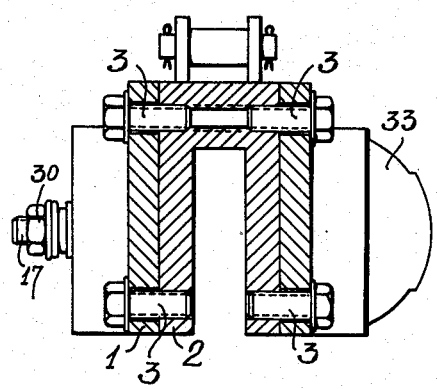

The mechanically actuated pads 6 (FIG. 4) in turn are carried by plates 15 adapted to slide in the second pair of opposed cylindrical seats in the block 2 of the brake, along the axes of the said seats. In order to avoid chatter, the plates 15 may carry in a suitable circumferential groove a ring 16 of rubber or similar material, which in addition to establishing resilient engagement with the wall of the cylindrical seats in the block 2, also exerts a certain return action on the plates. This assembly is illustrated in FIG. 5. The control mechanism of each of the plates 15 comprises: a threaded thrust pin 17 with a spherical head 17' screwed into a sleeve 18; a return spring 19 wound round the sleeve 18 normally urging the sleeve and the pin away from the plate 15, i.e. to non-braking position with respect to disc 4; a plate 20 with frontal cams which is free to slide axially but is locked in rotation by projections thereof (not shown) which engage in suitable grooves in the wall of the seat in the body 2; a cam plate 23 placed facing the cam plate 20 and constituted by the extension of the arm 22 of a forked control lever 21; three balls 24 disposed in conical seats 25 corresponding to one another in the cam plates 20 and 23; a plane roller thrust bearing 26 adapted to restrain the plate 23 from carrying out axial movements, the plate, however, being free to turn under the control of the lever 21, and which bears on a plane disc 27 held in position in turn by an elastic ring 28 mounted in a suitable groove in the wall of the seat in the body 2; and a washer 29 on which there bears, at that threaded end of the pin 17 which is remote from the head 17', the spring 19, the washer 29 being clamped against the outer end of the sleeve 18 by the nut 30 screwed on the pin 17. The two arms 22 of the forked lever 21 are joined by a pin 31 on which is exerted the action of pulling means (not shown) controlled by the driver of the vehicle to which the disc brake is fitted. The forked lever 21 can rotate or pivot through an arc defined by the two shoulders 32 formed on the outer surface of the block 2 of the bridge-like body of the brake. The reference 33 indicates dust caps which are mounted on both sides of the brake.

During normal running of the vehicle, braking thereof is carried out by making use of the two hydraulically operated friction pads 5. By applying pressure to the brake pedal, the driver causes the influx of the braking fluid into the cylinders 11, the displacement of the pistons 9 and, consequently, that of the pads 5 which, acting by friction on the disc 4 with a perfectly symmetrical action, cause the slowing down and stopping thereof.

In the event of failure of the hydraulic braking system or in similar emergency conditions and, more simply, for parking the vehicle, the mechanically actuated friction pads 6 will be put into operation instead. This is done in known manner by the driver operating a lever or a pedal which, by means of a suitable transmission, exerts a pull on the pin 31 of the forked lever 21, thereby pivoting it. The two cam plates 23, which are integral parts of the lever 21, are thus pivoted and with them the balls 24 which, since they are unable to carry the cam plates 20 along in the pivotal movement, mount the opposed conical ramps of the seats 25 of the balls, consequently producing a translation of the said plates 20 along the axes of the cylindrical seats in the body 2. As the plates 20 are shifted, they carry along the sleeves 18 and the pins 17 owing to the engagement of their central shoulder with a terminal flange provided on the sleeves. In turn, the pins 17 urge the plates 15 and the pads 6 fitted to them towards the disc 4, which is therefore frictionally engaged by the pads 6 until braking is obtained, this taking place with a perfectly symmetrical action on the two faces of the disc.

When the driver releases the hydraulic control, the pistons 9, no longer urged by the pressure of the braking fluid, tend to return to the inoperative position owing to the restoring effect exerted on them by the rubber rings 13, and the pads 5 release the disc 4 under the influence of its rotary movement; in this way, the braking action is determinated. Similarly, on release of the mechanical control, the springs 19, which have been compressed during the braking action, return the cam plates 20 through the pins 17 and the sleeves 18, causing the balls 24 to descend the conical ramps of the respective seats 25 again until they are brought once more into a central position therein. The friction pads 6 are therefore left free to move away from the disc 4 under the influence of the rotary movement of the latter and through the restoring action of the ring 16, and the braking action is also terminated in this case.

Adjustment of the pads 6 can be effected by varying (by screwing) the mutual positions of the pins 17 and sleeve 18 and then locking these two elements to one another by means of the nut 30. This operation must be performed on mounting of the brake and from time to time during use in order to compensate for wear. This is readily achieved with tools of known type after the dust caps 33 have been removed.

Figure 6:
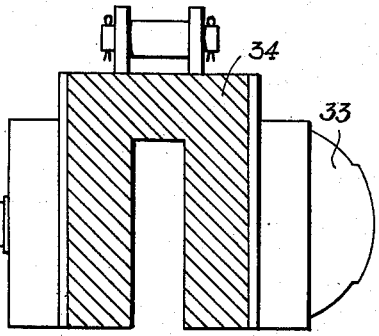
FIG. 6 is a section similar to that of FIG. 4 of a modified form of embodiment of the brake shown in FIG. 1.

In the form of embodiment described with reference to FIGS. 1 to 4, the bridge-like body of the brake is formed, as has been said, of two blocks 1 and 2 interconnected by means of bolts 3. However, the bridge-like body may, of course, be constituted by a single block. FIG. 6 illustrates this alternative embodiment in a clear manner, being a radial section corresponding to that of FIG. 4. In the said figure, the single block forming the bridge-like body of the brake has been indicated by the reference 34, the other parts of the brake which are similar to those of the foregoing form of embodiment being designated by the same reference numerals as in FIGS. 1 to 4.

It is to be understood that the described embodiments of the invention are illustrative only, and that many other embodiments, variations and applications of the invention, or the several features thereof disclosed, may be made without departing from the spirit and scope of the invention as defined in the following claim.

What is claimed is:

A disc braking system for motor vehicles, comprising, a braking disc fixed to a rotating part of vehicle, a bridge member straddling said disc, said bridge member being formed with a first pair of opposed seats one on each side of said disc and with a second pair of opposed seats one on each side of said disc, said second pair of opposed seats being angularly spaced along the periphery of said disc with respect to said first pair of opposed seats, a first pair of friction pads supported by said bridge member one from each of said first pair of opposed seats, a second pair of friction pads supported by said bridge member one from each of said second pair of opposed seats, hydraulic means for moving said first pair of friction pads into braking position with respect to said disc, a forked lever having a pair of arms straddling said bridge member and terminating within the seats of said second pair, a thrust pin mounted within each seat of said second pair and movable to cause the friction pad of said second pair to move from non-braking position to braking position with respect to said disc, said forked lever arms being pivotably mounted about said pins and being provided with frontal cam surfaces disposed within the seats of said second pair of said bridge member, a cam plate mounted in each seat of said second pair of said bridge member and slidable along the axis of the thrust pin and carrying the respective thrust pin therewith, a set of balls cooperable with each of said cam surfaces and cam plates effective to urge the cam plate, and thereby the thrust pin and friction pad thereof, into braking position with respect to said disc when the forked lever is pivoted, spring means normally urging the friction pads of said second pair into non-braking position with respect to said disc, and shoulders formed on said bridge member for limiting the pivotable movement of said forked lever.

References Cited by the Examiner

UNITED STATES PATENTS

| 1,142,880 | 6/15 | Hartman | 188—73 |
| 2,983,338 | 5/61 | Vansteenkiste | 188—73 |
| 3,024,873 | 3/62 | Wilkinson | 188—73 |

FOREIGN PATENTS

| 1,124,924 | 7/56 | France. |
| 1,231,537 | 4/60 | France. |
| 784,887 | 10/57 | Great Britain. |

ARTHUR L. LA POINT, *Primary Examiner.*

EUGENE G. BOTZ, *Examiner.*